Patented Mar. 22, 1927.

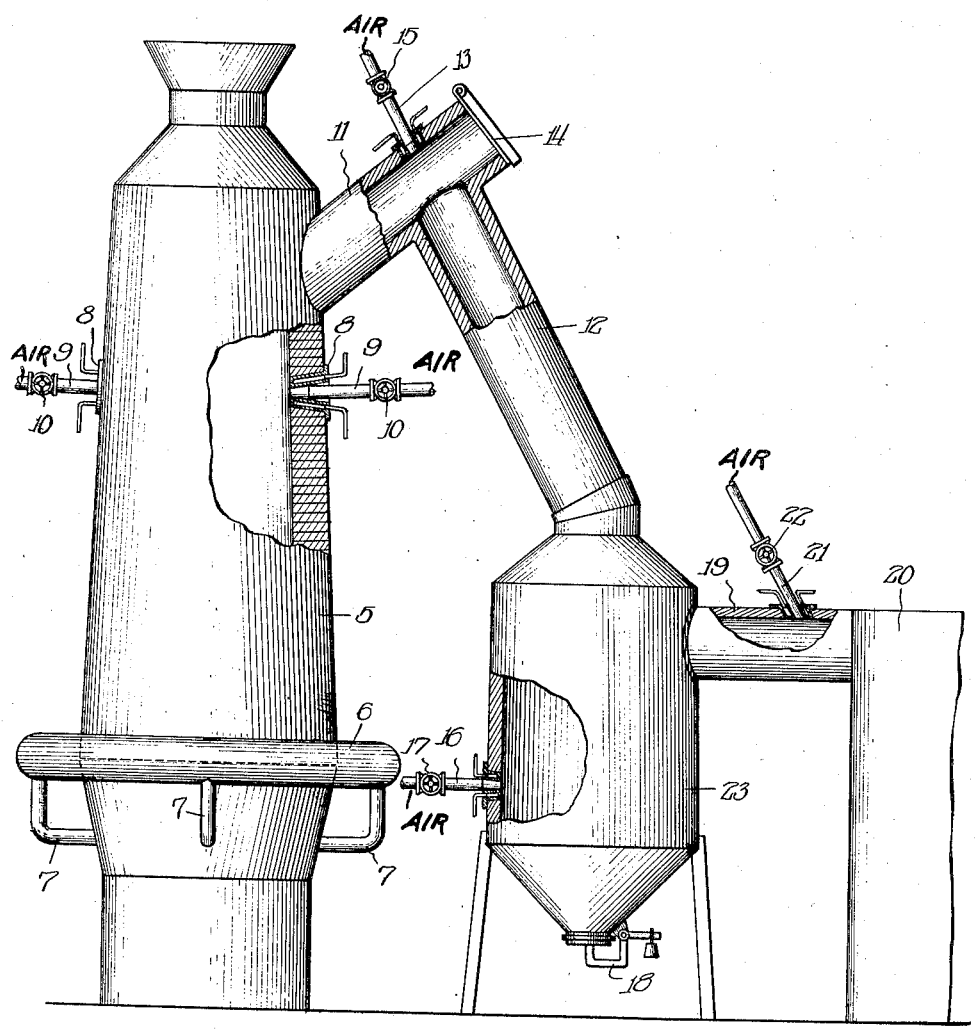

1,622,082

UNITED STATES PATENT OFFICE.

HERMAN A. BRASSERT, OF CHICAGO, AND WILLIAM H. WAGGAMAN AND HENRY W. EASTERWOOD, OF CHICAGO HEIGHTS, ILLINOIS, ASSIGNORS TO VICTOR CHEMICAL WORKS, OF CHICAGO, ILLINOIS, A CORPORATION OF ILLINOIS.

PRODUCTION OF PHOSPHORIC ACID.

Application filed January 23, 1924. Serial No. 687,930.

This invention is particularly in a process for controlling the combustion of phosphorus and for utilizing the heat of combustion of phosphorus evolved in the manufacture of phosphoric acid by the volatilization method.

This invention further provides a method for controlling the top temperature of furnaces of the shaft type and the temperature of flues leading therefrom and thus obviates the difficulties encountered in overheating of the said furnace top, the flue lining of the down-comer, and the dust catcher, and also renders it easy to prevent the deposition of phosphorus at these various points, which deposition otherwise may cause stoppage of the gas passages and interfere with the smooth and normal working of the furnace.

While this process is particularly adapted to furnaces or kilns of the shaft type where fuel is employed as a heating source in lieu of an electric or resistance furnace, it is to be understood, however, that its use is not confined to furnaces of any one type. This process also provides a method for collecting a portion of the phosphorus evolved in the furnace operation in the form of elemental phosphorus and makes it possible to so control conditions that the quantity of phosphorus collected as such, may be regulated.

It is well known that when phosphorus is driven off from mixtures of phosphate rock, silica and carbon in many types of furnaces from the application of high heat, a large portion of this phosphorus remains unoxidized because it is evolved under reducing conditions, and the gases of combustion in rising through a column of coke or other carbonaceous material, are so reduced that they do not contain sufficient oxygen or carbon dioxide to convert the phosphorus into $P_2O_5$. It has heretofore been proposed to introduce additional air into the upper part of the furnace either above or somewhat below the stone line to insure the complete oxidation of this phosphorus to $P_2O_5$, but this scheme is open to the following objections:

1. The oxidation of phosphorus to $P_2O_5$ is a highly exothermic reaction which tends to overheat the furnace top and to cause deterioration of the same. The excessive temperatures thus developed may also cause the lining of the downcomer or flue from the furnace to burn out or slag such a degree that it is necessary to reline this portion of the apparatus, which is not only expensive but entails shutting down the furnace.

2. The oxidation of the phosphorus at this point also has the objectionable feature that the heat units evolved in this reaction cannot be efficiently utilized in heating the blast air required in burning the fuel in the furnace.

On the other hand it is well known that a white or yellow phosphorus when heated to a temperature of 250 to 300 degrees C in a closed container or in a strictly reducing atmosphere, is converted as a whole or in part to an allotropic form known as red phosphorus. Unless the temperature of the outgoing gases from the furnace is kept sufficiently high to prevent the condensation of phosphorus and its deposit in the down-comer, dust catcher and flues, it may be deposited in such quantity as to seriously interfere with the free passage of the gas and volatile products from the furnace.

According to our present process, it is proposed, therefor, to introduce either into the upper part of the furnace or into the downcomer, or into the dust catcher or flues, or into any or all of these places, an amount of air or oxidizing gases sufficient to burn enough of the evolved phosphorus to raise the temperature of the outgoing gases to the point where the remaining phosphorus will not condense. This temperature must be above the point at which red phosphorus will deposit and should be maintained at from 350 to 700 degrees C. The flues and dust catcher may thus be kept free from deposition and the unburned phosphorus driven forward to the stoves or regenerative apparatus where it is completely burned along with the combustible gases. In this way the bulk of the phosphorus may be burned at the regenerative apparatus and its heat value utilized in raising the temperature of the air which is subsequently passed through regenerators in order to more efficiently burn the fuel in the furnace.

In case it is desired to collect a portion of the evolved phosphorus in the elemental state, air or oxidizing gases may be introduced into the top of the furnace and into the downcomer or at one of these points, but no oxidizing gases may be introduced into the dust catcher so that the temperature of this apparatus may be kept at a point sufficiently low to cause deposition of phosphorus which can subsequently be withdrawn through a suitable opening when it is desired to do so. In order to prevent the deposition of elemental phosphorus in the flues leading from the dust catcher to the stoves, air or oxidizing gases may be introduced into said flue at one or more points to burn enough phosphorus to keep the remaining quantity of this element moving forward to the regenerators.

By placing pyrometers at the various points enumerated above, a close watch may be kept on the temperature of the furnace system and the air or oxidizing gases admitted can be so regulated by means of valves that the temperatures may be maintained which will give the desired recovery of elemental phosphorus or insure the complete combustion of the element to $P_2O_5$. By lowering the temperature at any one given point, phosphorus may be recovered in elemental form or by raising the temperature by admission of quantities of oxidizing gases, the phosphorus may be kept moving freely through the system with the least loss of valuable heat units and without encountering the mechanical difficulties due to the accumulation of phosphorus deposits in the furnace, flues and dust catchers.

We have illustrated in the accompanying drawing an apparatus adapted for carrying out our improved process. The single figure of the drawing shows in elevation the furnace and the associated downcomer, dust catcher, and flues, parts being broken away to more clearly show the construction.

The furnace 5 is of the usual vertical type, adapted for the production of phosphoric acid. It is provided at its lower portion with the bustle pipe 6 and the tuyères 7 for introducing the air for combustion of the fuel and the consequent liberation of the phophorus which is volatilized and passes off at the upper portion of the furnace. In the upper portion of the furnace are provided the water cooled tuyère housings 8 through which air is introduced by means of pipes 9 controlled by valves 10.

The flue 11 leads from the upper portion of the furnace and is connected by downcomer 12 to the top of the dust catcher 23. The air introduction pipe 13 is directed through the wall of the flue 11 in line with the downcomer 12. The outer end of the flue 11 is provided with the valve closure 14. Air pipe 13 is controlled by valve 15.

The dust catcher 23 is provided with the air inlet pipe 16 controlled by valve 17. It is further provided at its lower end with the usual type of door 18 for the removal of material deposited in the dust catcher. From the dust catcher the flue 19 leads to the regenerator 20. The air pipe 21 is introduced into flue 19, the pipe being controlled by valve 22. This pipe 21, as shown, is inclined in the direction of flow of the gases in flue 19.

The phosphate rock and fuel are placed in the furnace in the usual manner and the phosphorus driven out by the heat of combustion. This volatilized phosphorus is maintained in the volatile condition by introducing air through any or all of the pipes 9, 13, 16 and 21. Just sufficient air will preferably be introduced at each point to cause sufficient combustion to maintain the unburned phosphorus at a temperature such as to keep it in the volatile condition. As has been stated, if it is desired to deposit some of the phosphorus as elemental phosphorus in the dust catcher, air introduced in the dust catcher may be reduced or entirely cut off so that a controlled amount of phosphorus will be deposited. The volatilized phosphorus will normally be burned in the regenerator 20 and the heat of combustion thus recovered and used to heat the blast air or for other purposes.

While we have shown an apparatus comprising a furnace in which the phosphorus is driven off by combustion, it will be evident that our method of maintaining the phosphorus in volatile condition and of depositing any desired portion of elemental phosphorus may be carried out in connection with phosphorus originally volatilized in other types of furnaces. The particular apparatus and method shown are intended to be illustrative only and we contemplate such changes and modifications as come within the spirit and scope of the accompanying claims.

We claim:

1. In the production of phosphoric acid by the pyrolytic process, the method of controlling the deposition of elemental phosphorus which consists in maintaining the temperature of the volatilized phosphorus within a desired range by means of heat derived from the combustion of a portion of said volatilized phosphorus.

2. In the production of phosphoric acid by the pyrolytic process, the method of controlling the deposition of elemental phosphorus throughout the apparatus and passages which consists in maintaining the temperature of the volatilized phosphorus within a desired range by means of heat derived from the combustion of a portion of said volatilized phosphorus, said combustion taking place at a plurality of points in the apparatus and passages.

3. In the production of phosphoric acid by the pyrolytic process, the method of controlling the deposition of elemental phosphorus which consists in selectively bringing oxidizing gases into contact with the phosphorus at such points and in such quantities as to maintain sufficient combustion to keep the temperature sufficiently high to limit the deposition of the phosphorus 4. In the production of phosphoric acid by the pyrolytic process, the method which comprises regulating the deposition of elemental phosphorus by controlling the temperature of the volatilized phosphorus whereby the deposition of elemental phosphorus is controlled and subsequently burning the volatilized phosphorus and recovering the heat of combustion for utilization in the volatilization of the phosphorus.

5. In the production of phosphoric acid by the pyrolytic process, the method which comprises regulating the deposition of elemental phosphorus by burning a portion of the volatilized phosphorus whereby temperatures are secured adapted to maintain the desired volatilization and subsequently burning the remainder of the volatilized phosphorus and recovering the heat of the combustion for utilization in the volatilization of the phosphorus.

Signed at Chicago, Illinois, this 17th day of January, 1924.

Signed at Chicago Heights, Cook Co. Illinois, this 19th day of January, 1924.

Signed at Chicago Heights, Cook Co. Illinois, this 19th day of January, 1924.

HERMAN A. BRASSERT.
WILLIAM H. WAGGAMAN.
HENRY W. EASTERWOOD.